UNITED STATES PATENT OFFICE.

HENRY T. ANTHONY, OF NEW YORK, N. Y., ASSIGNOR TO E. AND H. T. ANTHONY & CO., OF SAME PLACE.

IMPROVEMENT IN PREPARING SOLUBLE COTTON FOR THE MANUFACTURE OF COLLODION.

Specification forming part of Letters Patent No. 143,865, dated October 21, 1873; application filed October 7, 1873.

*To all whom it may concern:*

Be it known that I, HENRY T. ANTHONY, of the city and State of New York, have invented an Improvement in the Manufacture of Soluble Cotton for Collodion, of which the following is a correct description:

Soluble cotton has heretofore been made by soaking the same in the usual mixture of nitric and sulphuric acids, and then washing out the traces of acid as far as possible.

In practice, great difficulty arises in removing the free acid, and consequently the cotton changes and becomes injured by lapse of time. Alkaline solutions have been tried for removing the traces of acid, but difficulty arises in determining the extent of alkaline treatment required, and if too much alkali is used the cotton is injured.

I employ the ordinary mode of preparing the cotton by the acid mixture, and then wash the cotton and dry it, or nearly so, and I then subject the cotton to the action of the volatilized alkali, which penetrates the mass, and combines with the remaining traces of acid and neutralizes the same, and the cotton is not in any way injured by the volatilized alkali; on the contrary, the soluble cotton will remain unchanged for a long period of time, and the collodion made therefrom possesses increased sensitiveness for photographic uses.

I prefer and use ammonia, but do not limit myself to the character of volatile alkali employed, and the alkali may be volatilized at the atmospheric temperature, or by any desired degree of heat.

I claim as my invention—

The method of preparing soluble cotton by subjecting the same to volatilized alkali after the ordinary acid treatment and washing, substantially as set forth.

Signed by me this 3d day of October, A. D. 1873.

HENRY T. ANTHONY.

Witnesses:
.GEO. T. PINCKNEY,
CHAS. H. SMITH.